(12) United States Patent
Peres et al.

(10) Patent No.: US 11,027,857 B2
(45) Date of Patent: Jun. 8, 2021

(54) LIGHTNING PROTECTION DEVICE FOR AN AIRCRAFT, AIRCRAFT COMPRISING SUCH A LIGHTNING PROTECTION DEVICE

(71) Applicant: AIRBUS SAS, Blagnac (FR)

(72) Inventors: Gilles Peres, Toulouse (FR); Ivan Revel, Ramonville (FR)

(73) Assignee: AIRBUS SAS

( * ) Notice: Subject to any disclaimer, the term of this patent is extended or adjusted under 35 U.S.C. 154(b) by 295 days.

(21) Appl. No.: 16/181,513

(22) Filed: Nov. 6, 2018

(65) Prior Publication Data
US 2019/0135449 A1  May 9, 2019

(30) Foreign Application Priority Data
Nov. 9, 2017  (FR) ..................... 17 60532

(51) Int. Cl.
  *B64D 45/02*  (2006.01)
  *H01T 19/02*  (2006.01)
  *H01T 19/04*  (2006.01)
  *H02G 13/00* (2006.01)

(52) U.S. Cl.
  CPC ............. *B64D 45/02* (2013.01); *H01T 19/02* (2013.01); *H01T 19/04* (2013.01); *H02G 13/00* (2013.01); *H02G 13/40* (2013.01); *H02G 13/80* (2013.01)

(58) Field of Classification Search
  CPC ......... B64D 45/02; H01T 19/02; H01T 19/04; H02G 13/00; H02G 13/40; H02G 13/80
  See application file for complete search history.

(56) References Cited

U.S. PATENT DOCUMENTS

| 2,497,924 | A | * | 2/1950 | Beach | B64D 45/02 |
| | | | | | 361/218 |
| 2,515,182 | A | * | 7/1950 | Bennett | B64D 45/02 |
| | | | | | 244/1 A |
| 3,106,663 | A | * | 10/1963 | Tanner | B64D 45/02 |
| | | | | | 361/218 |
| 3,617,805 | A | | 11/1971 | Truax | |
| 3,628,090 | A | * | 12/1971 | McLain | B64D 45/02 |
| | | | | | 361/222 |
| 5,542,624 | A | * | 8/1996 | Smith | H02G 13/00 |
| | | | | | 244/1 A |
| 6,307,149 | B1 | * | 10/2001 | Zini | H02G 13/00 |
| | | | | | 174/3 |
| 2016/0264257 | A1 | * | 9/2016 | Han | H02G 13/00 |

FOREIGN PATENT DOCUMENTS

FR      2 163 372 A1    7/1973

* cited by examiner

*Primary Examiner* — Kyle J Moody
*Assistant Examiner* — Jye-June Lee
(74) *Attorney, Agent, or Firm* — Lerner, David, Littenberg, Krumholz & Mentlik, LLP

(57) ABSTRACT

A lightning protection device for an aircraft, includes an anti-corona element taking a rounded shape and having an electrically conductive surface, intended for enveloping an area of the airframe of the aircraft that is liable to receive a lightning strike, one or more electric charge dissipators attached to said anti-corona element.

8 Claims, 6 Drawing Sheets

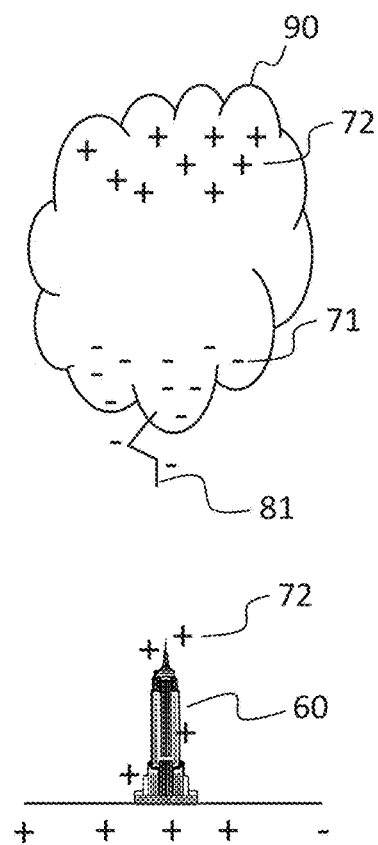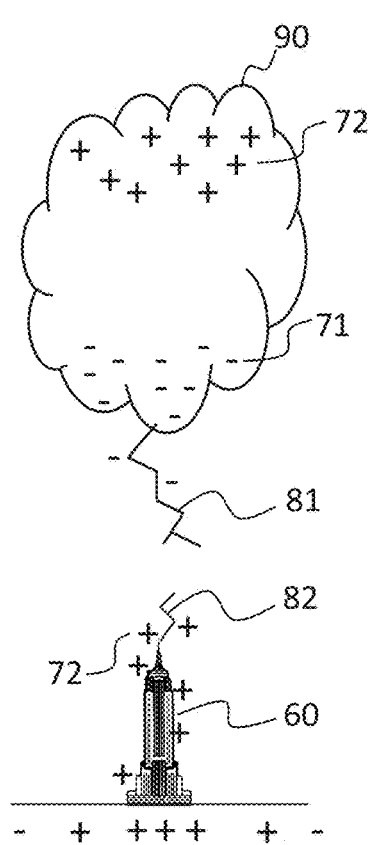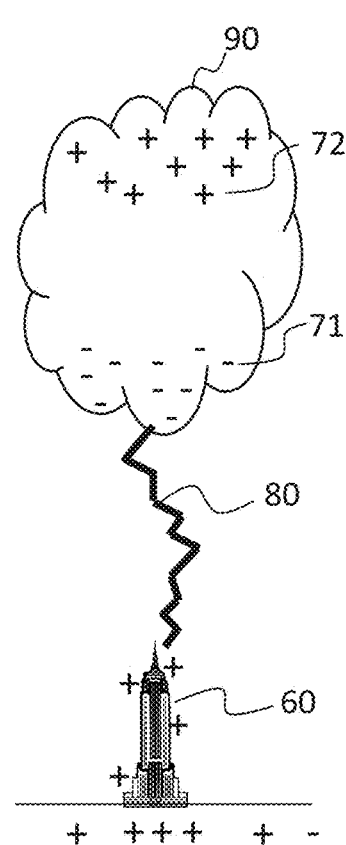
Fig. 1a
(PRIOR ART)
Fig. 1b
(PRIOR ART)
Fig. 1c
(PRIOR ART)

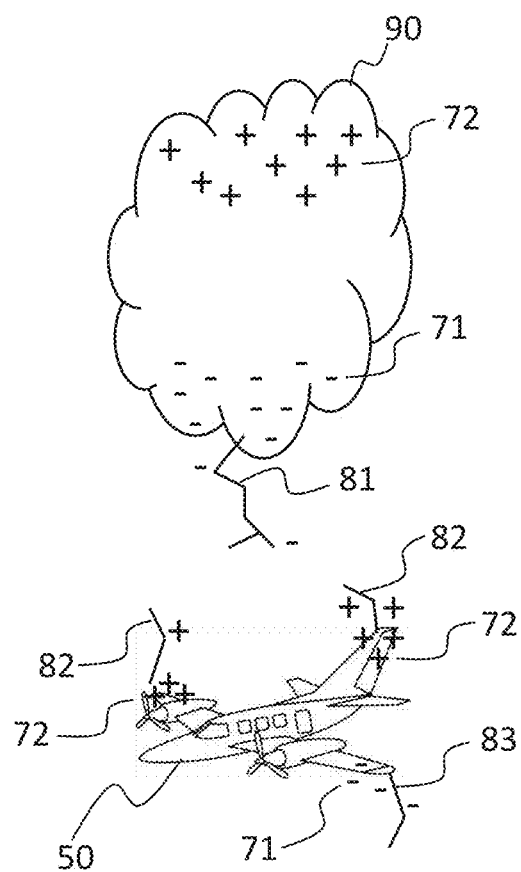
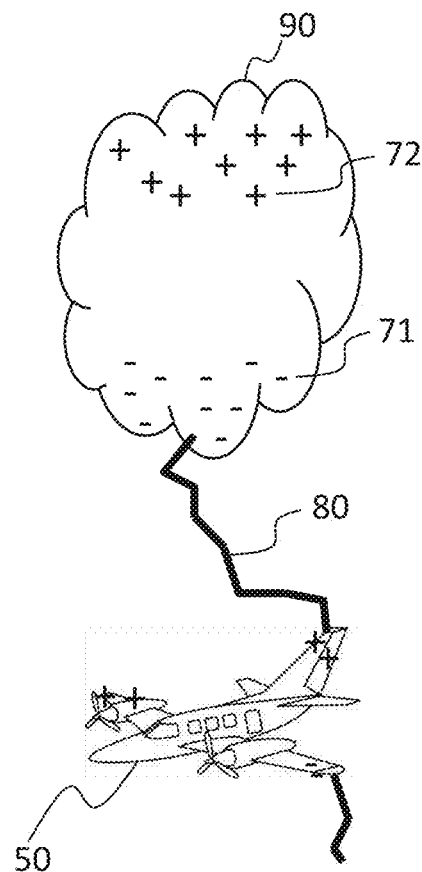
Fig. 2a
(PRIOR ART)
Fig. 2b
(PRIOR ART)

LIGHTNING PROTECTION DEVICE FOR AN AIRCRAFT, AIRCRAFT COMPRISING SUCH A LIGHTNING PROTECTION DEVICE

FIELD OF THE INVENTION

The present invention pertains to the field of lightning protection systems suitable for the aerospace field. In particular, the invention relates to a device for decreasing the risk of lightning strike for a small aircraft.

BACKGROUND OF THE INVENTION

The electric discharge associated with lightning generally occurs between a cloud and the ground, between two clouds, or inside one and the same cloud. FIGS. 1(a)-1(c) schematically show the formation of a lightning discharge between a cloud 90 and the ground. In the cloud 90, positive electric charge 72 develops and is generally concentrated toward the top of the cloud, while negative electric charge 71 is distributed toward the bottom of the cloud 90. The development and distribution of the electric charges 71, 72 in the cloud 90 have the effect of considerably increasing the electric field between the base of the cloud 90 and the ground. An electrically charged area, the polarity of which is the opposite of that of the electric charge 71 at the base of the cloud 90, is then formed at ground level below the cloud 90, and more particularly at the level of tall and pointed objects (trees, poles, buildings, etc.). This is the case in particular for the building 60 shown in FIGS. 1(a)-1(c). The formation of an ionized channel through the air constitutes the first phase in the development of the electric discharge known as lightning. This first phase is illustrated in FIG. 1(a). An ionized channel, also called a "downward leader" 81, can travel from the base of the cloud 90 to the ground via successive steps of a few tens of meters before splitting into multiple branches as it approaches the ground. As the distance between a downward leader 81 and the ground decreases, the electric field at ground level increases until it reaches a critical value (corresponding to the dielectric strength of air, which is of the order of 30 kV/cm), resulting in corona discharges at the tops of certain tall objects, for example at the top of the building 60, caused by ionization of the air. In an avalanche process, if the electric field is sufficiently strong, the ionization may be amplified and give rise to an "upward streamer" 82. As shown in FIGS. 1(b) and 1(c), when a downward leader 81 comes into contact with an upward streamer 82, which generally occurs a few tens of meters above the ground, the completed ionized channel 80 between the cloud 90 and the ground allows a lightning current to flow.

Lightning discharges between two clouds, or inside one and the same cloud, exhibit phenomena similar to those described above with reference to FIGS. 1(a)-1(c) for a lightning discharge between a cloud and the ground.

Aircraft are sometimes struck by lightning, either because the aircraft "intercepts" a lightning discharge whose origin is independent of the presence of the aircraft, or because the aircraft plays a role in the formation of the ionized channel, in particular by giving rise to an upward streamer 82.

The passage of a lightning current through an aircraft may result in potentially substantial damage. "Direct" effects of the lightning current are for example related to the generation thereby of very high thermal and mechanical stresses in the airframe of the aircraft. These stresses are due to a very substantial increase in temperature and the formation of a shockwave at the point of contact that can damage the airframe of the aircraft. "Indirect" effects can sometimes also be observed: specifically, the lightning current can generate electromagnetic interference that may result in electronic equipment on board the aircraft, such as for example navigation or communication equipment, malfunctioning.

For these reasons, protecting aircraft from the effects of lightning remains a prime concern for aerospace manufacturers. Indeed, the vulnerability of aircraft to the effects of lightning is increasing with the growing use of composite materials for the airframes of aircraft, and with the increased sensitivity of electronic equipment to the interference generated by a lightning current. Specifically, when the airframe of the aircraft is mainly made of metal, it behaves like a Faraday cage when it is struck by lightning, and it then confers a maximum level of protection on the on-board electronic equipment. Conversely, the composite materials that are increasingly finding use in aerospace manufacture are generally poorer conductors of electricity, and they do not have the same magnetic shielding properties as metal materials.

To date, aerospace manufacturers have not sought to decrease or to eliminate the risk of an aircraft being struck by lightning, since this risk cannot be entirely excluded. In practice, they seek instead to improve the behavior of the aircraft in the event of a lightning strike. For example, a metal mesh may be positioned on a surface of a composite material part in order to increase the electrical conductivity and to promote the dissipation of the lightning current in a strike. This type of protection is however not suitable for small aircraft, for which the ratio of the area of the aircraft to be treated, and hence of the weight of the treatment, to the volume of the aircraft is unfavorable.

In order to limit the risk of small aircraft, for example tourist planes, being struck by lightning, a flight ban is generally imposed when a storm warning is in effect. This precautionary measure is however unsuitable for the small aircraft that are currently being designed in the context of urban mobility for the role of personal air vehicle.

Various solutions exist for protecting buildings on the ground or ships from lightning. Some aim to promote a lightning strike at a determined point in order to protect a particular area, as is the case with lightning rods. Others aim, conversely, to avoid a lightning strike, as is the case for example with electrostatic charge dissipators, which seek to make an object invisible to the downward leaders arising from a cloud 90. Such a device aims to dissipate the electric charge that has built up at one end of the object to which it is attached. It generally features a large number of thin metal spikes, on the surface of which multiple corona microdischarges take place, resulting in the dissipation of the electric charge. Such devices are for example installed at the top of certain buildings, or at the top of the masts of some ships. However, they have several drawbacks: their shape does not allow them to be installed on an aircraft since it results in an increase in aerodynamic drag, their effectiveness is limited and, to handle those cases in which they do not manage to prevent the formation of an upward streamer, it is preferable for them to be combined with a lightning rod and with its down-conductors allowing a lightning current to be carried away.

In the aerospace field, static dischargers are often positioned on the trailing edges of the wings or of the empennage of an aircraft in order to dissipate the electric charge that has built up by triboelectric charging through friction between the airframe of the aircraft and particles encountered during particular meteorological phenomena (rain, snow, hail, dust, etc.). They generally take the form of a thin rod made of an electrically conductive material. These devices seek to limit the buildup of electrostatic charge, the discharge of which into the air generates radiofrequency emissions that are a source of interference with the electronic systems of the aircraft. They are however ineffective when it comes to decreasing the risk of the aircraft being struck by lightning in a storm.

Thus, although a widespread use of small aircraft playing the role of personal air vehicles is considered in the context of urban mobility, there exists no effective system for significantly decreasing the risk of such an aircraft being struck by lightning.

Decreasing the risk of a lightning strike would however decrease the costs associated with maintaining and repairing aircraft due to the damage caused by lightning, and would make it possible to simplify the protection means implemented to limit the effects of a lightning strike.

BRIEF SUMMARY OF THE INVENTION

Aspects of the present invention may overcome all or some of the drawbacks of the prior art, in particular those presented above, by providing a device that aims to significantly decrease the risk of an aircraft being struck by lightning.

One particularly advantageous but entirely nonlimiting application of the invention is that of the small aircraft that are currently being designed in the context of urban mobility for the role of personal air vehicle. Specifically, this type of aircraft is particularly vulnerable to the risk of lightning strike since it is intended for low altitude flight in all weathers for everyday journeys and, in order to save weight, its airframe generally does not include sufficient metal shielding for carrying away a large lightning current and limiting the damage caused by a lightning strike.

According to a first aspect, the invention relates to a lightning protection system called a "lightning protection device", including an anti-corona element taking a rounded shape and having an electrically conductive surface, intended for enveloping an area of the airframe of the aircraft that is liable to initiate the release of a lightning streamer, one or more electric charge dissipators attached to said anti-corona element and a dielectric shell surrounding the anti-corona element and the one or more charge dissipators.

Such arrangements make it possible to decrease the risk of a lightning strike at the area to be protected by preventing the formation, at said area, of a corona discharge that may lead to the formation of an upward streamer that could initiate a lightning discharge.

As well as providing protection (for example from impacts or from corrosion), the dielectric shell allows the aerodynamics of the aircraft to be improved by limiting the effect of the lightning protection device on aircraft drag.

In particular embodiments, the lightning protection device may further include one or more of the following features, taken individually or in all technically possible combinations.

In particular embodiments, each charge dissipator passes at least partially through said dielectric shell. In particular embodiments, a portion of the conductive surface of the anti-corona element is flush with an outer surface of the dielectric shell so as to form a preferential area for receiving a lightning strike. Such arrangements allow the lightning protection device to be protected in the case that, despite the implemented means, a lightning strike nonetheless occurs, by promoting a strike at the site of the anti-corona element rather than on the dielectric shell or the charge dissipators.

In particular embodiments, a charge dissipator includes an electrically conductive rod, one end of which is attached to the anti-corona element and the other end of which serves as an attachment point for a set of electrically conductive filaments, of which only one end of each filament, distal from the rod, protrudes from the dielectric shell. Each filament thus passes through the dielectric shell and only a portion of the filament protrudes from the exterior of the shell. The dielectric shell then allows the electric field to be locally strengthened at the end of each filament that protrudes from the shell, and thus the dissipation of electric charge to be promoted.

In particular embodiments, the lightning protection device includes two charge dissipators, the anti-corona element is substantially spherical, the dielectric shell is substantially ellipsoidal in shape, the center of which substantially coincides with the center of the anti-corona element, and each charge dissipator extends radially from the anti-corona element at two points that are diametrically opposed along the longest axis of the ellipsoid formed by the dielectric shell.

In particular embodiments, the set of filaments of each charge dissipator conforms to the shape of a vertex of the ellipsoid formed by the dielectric shell.

In particular embodiments, the end of a filament that is distal from the rod of a charge dissipator protrudes from the dielectric shell by a length that is at least equal to 10% of the thickness of the dielectric shell through which said filament passes.

In particular embodiments, each filament has a diameter comprised between 50 and 500 µm and is made of a conductive material, the electrical resistivity of which is at least 100 times higher than that of a rod.

The use of thin and resistive filaments makes it possible to promote the dissipation of electric charge while limiting the intensity of the corona micro-discharges by way of which this dissipation occurs.

In particular embodiments, the anti-corona element is made of aluminum alloy.

According to a second aspect, the present invention relates to an aircraft including a lightning protection device according to any one of the preceding embodiments.

In particular embodiments, the lightning protection device is incorporated into the aircraft such that the major axis of the ellipsoid formed by the dielectric shell substantially coincides with the main direction of movement of the aircraft. Such arrangements make it possible in particular to optimize aerodynamic drag, and to generate a space charge region enveloping the lightning protection device and further limiting the risk of a lightning strike.

BRIEF DESCRIPTION OF THE DRAWINGS

The invention will be better understood upon reading the following description provided by way of completely non-limiting example and with references to the FIGS. 1 to 9, which show:

FIGS. 1(a)-1(c): a schematic representation of the formation of a lightning discharge between a cloud and a building on the ground (figure mentioned above in the prior art);

FIGS. 2(a)-2(b): a schematic representation of the formation of a lightning discharge involving an aircraft;

Figure 3A:
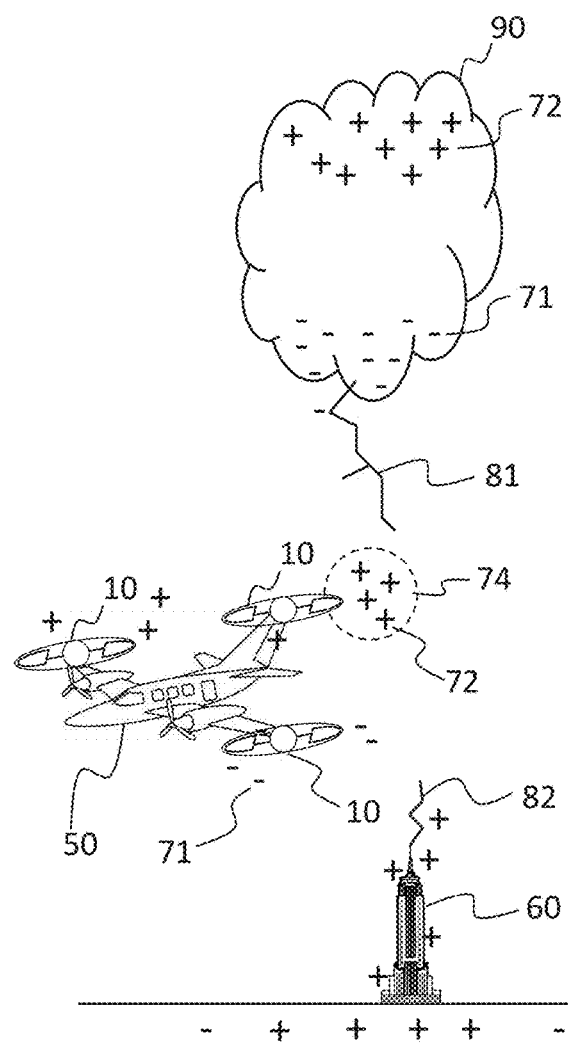
FIGS. 3(a)-3(b): schematic representation of the operation of a lightning protection device according to an embodiment of the invention.

In these figures, references that are the same from one figure to the next denote elements that are identical or analogous. For the sake of clarity, the elements are not necessarily shown to scale, unless stated otherwise.

DETAILED DESCRIPTION

The present invention relates to a lightning protection device aiming to significantly decrease the risk of a lightning strike on an aircraft.

Throughout the rest of the description, and for the reasons mentioned above, the case of a small aircraft 50 envisaged in the context of urban mobility for use as a personal air vehicle is used by way of nonlimiting example. It should however be noted that the present invention can also be applied to other types of aircraft that are, because of their airframe, vulnerable to a lightning strike, and the speed of which is low enough that the aerodynamic effect of a lightning protection device according to an embodiment of the invention is still acceptable, such as for example drones, helicopters, or light aircraft such as tourist planes or microlights. More generally still, the present invention may also be intended for other vehicles, such as for example ships, or even for fixed elements such as buildings.

FIGS. 2(a)-2(b) show the formation of a lightning discharge involving an aircraft 50. In the example shown in FIG. 2(a), negative electric charge 71 is concentrated toward the bottom of a cloud 90, while positive electric charge 72 is concentrated toward the top of the cloud 90. The aircraft 50 passing close to the cloud 90 is then subjected to an electric field that causes the electric charges 71, 72 present on the airframe of the aircraft 50 to be redistributed toward its extremities, such as for example the tips of the wings 51 or the tips of the planar surfaces of the empennage. Depending on the orientation of the electric field in which the aircraft 50 is immersed, the electric charges 71, 72 that have built up at the extremities of the aircraft 50 are either positive (for the extremities located on the side of the base of the cloud 90) or negative (for the extremities located opposite the base of the cloud 90).

As illustrated in FIG. 2(a), a downward leader 81 may arise at the base of the cloud 90 and travel gradually by successive steps of a few tens of metres. This downward leader 81 corresponds to the beginning of an ionized channel through the air which carries an electric charge and travels towards an area of opposite charge. As the distance between the downward leader 81 and the aircraft 50 decreases, the electric field on certain portions of the airframe of the aircraft 50 may increase until it reaches a critical value corresponding to the dielectric strength of air, resulting in upward streamers 82, 83 via corona discharges. These upward streamers 82, 83 are either positive upward streamers 82 or negative upward streamers 83 depending on the sign of the electric charges 71, 72 from which they arise.

When, as shown in FIG. 2(b), a negative downward leader 81 comes into contact with a positive upward streamer 82, the completed ionized channel 80 between the cloud 90 and the aircraft 50 allows a lightning current to flow, which may result in potentially substantial damage to the airframe of the aircraft 50 or to its electronic equipment. It should be noted that the formation of such a completed ionized channel 80 between the cloud 90 and the aircraft 50 obviously assumes a connection with another buildup of electric charge (in the example under consideration this is a buildup of positive electric charge), for example on the ground or in another cloud. This other buildup of electric charge forming the terminal end of the completed ionized channel 80 is not shown in FIGS. 2(a)-2(b) for the sake of simplification.

It should be noted that in the example described with reference to FIGS. 2(a)-2(b), the downward leader 81 is a negative downward leader, arising from the base of the cloud 90, which is negatively charged, and resulting in what is commonly called a negative lightning strike. According to another example, the downward leader may be positive if it originates in the upper part of the cloud 90 and results in a positive lightning strike if it joins up with a negative upward stream 83.

It should also be noted that according to yet another example, an upward streamer 82 may form by itself at an extremity of the aircraft 50 and travel toward the cloud 90, triggering a downward leader 81 at the base of the cloud 90 and then a lightning discharge when the upward streamer 82 and the downward leader 81 meet.

Figure 3B:
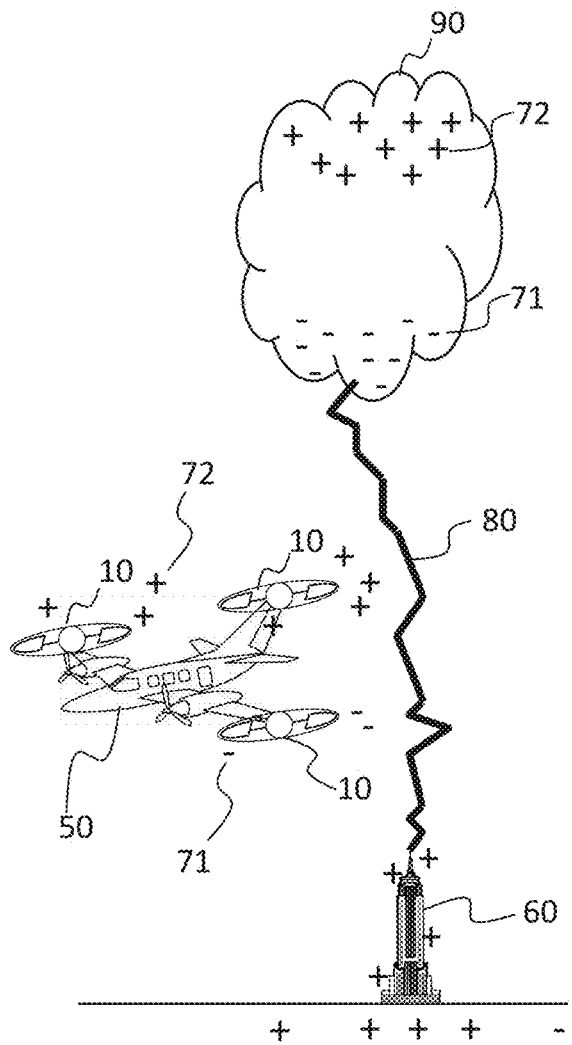

FIGS. 3(a)-3(b) shows a situation that is analogous to that shown in FIGS. 2(a)-2(b), namely an aircraft 50 passing close to the negatively charged base of a cloud 90. Unlike the aircraft 50 shown in FIGS. 2(a)-2(b), the aircraft 50 shown in FIGS. 3(a)-3(b) includes multiple lightning protection devices 10 according to an embodiment of the invention in order to considerably decrease the risk of lightning strike. In the completely nonlimiting example shown in FIGS. 3(a)-3(b), the aircraft 50 includes such a lightning protection device 10 at the end of each of its two wings, as well as on the vertical part of its empennage.

In FIG. 3(a), a downward leader 81 has arisen at the base of the cloud 90 and is approaching the aircraft 50 and the ground, on which in particular a building 60 is sited. The objective of the lightning protection device 10 according to an embodiment of the invention is to make the aircraft 50 "invisible" to the approach of the downward leader 81 by preventing or delaying the appearance of upward streamers 82, 83 on the airframe of the aircraft 50. The means implemented by the lightning protection device 10 for achieving this objective are manifold and will be detailed throughout the rest of the description.

It is partly a question of dissipating the electric charges 71, 72 that have built up on the extremities of the aircraft 50 through corona micro-discharges, the size of which is small enough not to initiate upward streamers 82. This dissipation of the electric charges 71, 72 results in a decrease in the electric field at the extremities of the airframe of the aircraft 50. An electric field 70 observed locally at an extremity, despite the point effect which tends to increase the intensity thereof, is then no longer sufficient to trigger a corona discharge that may result in the formation of an upward streamer 82. Stated otherwise, the dissipation of the electric charges 71, 72 contributes to keeping the amplitude of the electric field 70 present in the vicinity of the extremities of the airframe of the aircraft 50 at a value below the initiation threshold for a streamer. Additionally, the space charge 74 created by the buildup of the dissipated electric charges 71, 72 in the air reinforces the limitation of the electric field 70 at the surface of the aircraft 50. Specifically, this space charge 74 generates an electric field, referred to as a "space charge electric field", which opposes the electric field 70 present at the point from which it has arisen.

It is also a question of adjusting the geometry of the airframe of the aircraft 50 with a view to limiting the electric potential gradient at its extremities for the purpose of preventing the triggering of a corona discharge that could give rise to an upward streamer 82.

Conversely, an upward streamer 82 could arise at ground level, for example at a high point of a building 60. FIG. 3(*b*) shows the completed ionized channel 80 resulting from the meeting of the downward leader 81 and the upward streamer 82 arising from the building 60. A lightning current may then flow through this channel. By preventing the formation of an upward streamer 82 at aircraft 50 level, the lightning protection device 10 has made it possible for the aircraft 50 to avoid a lightning strike.

It should be noted that the objective of the lightning protection device 10 is not only to make the aircraft 50 invisible to a potential downward leader 81 arising from the cloud 90, but also to prevent the autonomous formation of an upward streamer 82 (independently of the existence of a downward leader 81).

Figure 4:
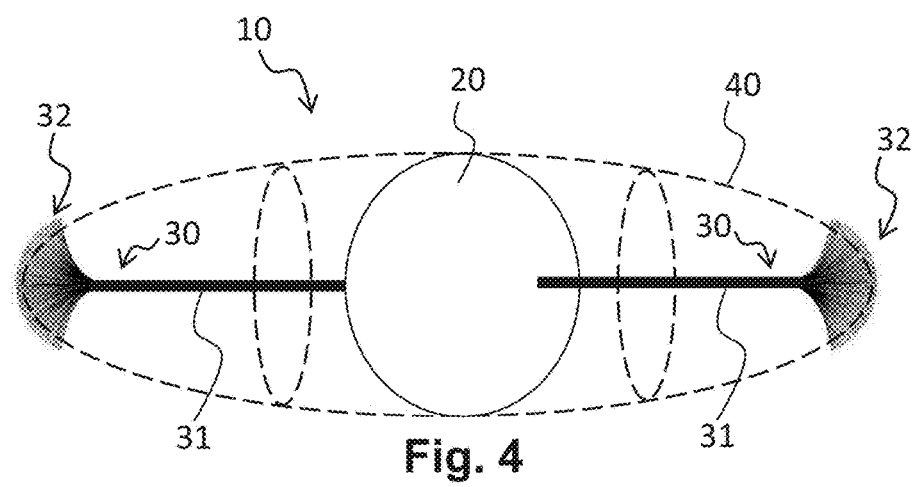
FIG. 4: a schematic representation of one particular embodiment of a lightning protection device according to the invention.

FIG. 4 shows one particular embodiment of a lightning protection device 10 according to an embodiment of the invention. It comprises an anti-corona element 20 that takes a rounded shape and has an electrically conductive surface, for example a metal sphere. This element 20 is qualified as an "anti-corona" element because its objective is to prevent the triggering of a corona discharge, which could result in the formation of an upward streamer 82. This anti-corona element 20 will be described in greater detail below with reference to FIGS. 5(*a*)-5(*b*).

The lightning protection device 10 also includes two charge dissipators 30 that extend radially from the anti-corona element 20 at two diametrically opposed points. Each charge dissipator 30 comprises a rod 31, one end of which is attached to the anti-corona element 20 and the other end of which serves as an attachment point for a set 32 of electrically conductive filaments 33. The function of the dissipators 30 is to dissipate (in other words to release into the surrounding air) the electric charges 71, 72 that have built up on the extremities of the aircraft 50 through corona micro-discharges, the size of which is small enough not to initiate upward streamers 82. Such a charge dissipator 30 will be described in greater detail below with reference to FIGS. 6 and 7.

It should be noted that the number of charge dissipators 30 included in the lightning protection device 10 may vary, and this choice constitutes merely a variant embodiment of the invention.

The lightning protection device 10 is intended for installation in areas of the aircraft 50 corresponding to areas liable to receive a lightning strike, in particular at the end of a protruding part of the airframe of the aircraft 50, for example at the tip of a wing 51 or at the tip of the empennage 52. Advantageously, in order to limit the aerodynamic impact of the lightning protection device, the anti-corona element 20 and the two charge dissipators 30 are incorporated within a dielectric shell 40, made for example of glass fiber, the shape of which minimizes its aerodynamic drag. For example, the shell 40 is ellipsoidal in shape, the center of which coincides with the center of the sphere of the anti-corona element 20 and the longest axis of which is oriented along the rods 31 of the charge dissipators 30. The filaments 33 of the charge dissipators 30 are arranged such that only a part of their length protrudes from the dielectric shell 40 in the proximity of each end of the ellipsoid along its longest axis. Besides aerodynamic performance, the dielectric shell 40 may also play a role in mechanical protection (for example from impacts) and/or chemical protection (for example from attacks such as corrosion), and may also otherwise provide an esthetic advantage. It will also be explained below how the dielectric shell 40 contributes to increasing the effectiveness of the charge dissipators 30.

It should be noted that the invention may of course be produced while choosing another shape for the dielectric shell 40. For example, each end of the dielectric shell 40 may be shaped like a bullet, potentially truncated by a sphere, or else the dielectric shell 40 may be ovoidal in shape or shaped like a teardrop. The shape may of course be optimized, in the conventional manner, by means of wind tunnel tests with a view to optimizing its aerodynamics. In the example under consideration, the dielectric shell 40 is a hollow shell, the thickness of the wall of which is suitable for resisting the aerodynamic forces to which it is subjected when in use, taking into account the material used.

In one embodiment, the hollow portion of the shell 40 is filled with a cellular material, for example a polyurethane foam, which allows said shell to be strengthened while minimally affecting the weight.

In particular embodiments, the lightning protection device 10 includes no dielectric shell 40. This is for example the case when aerodynamics, protection from the environment, or esthetics are of little or no importance for the object protected by the lightning protection device 10.

Figures 5A, 5B:
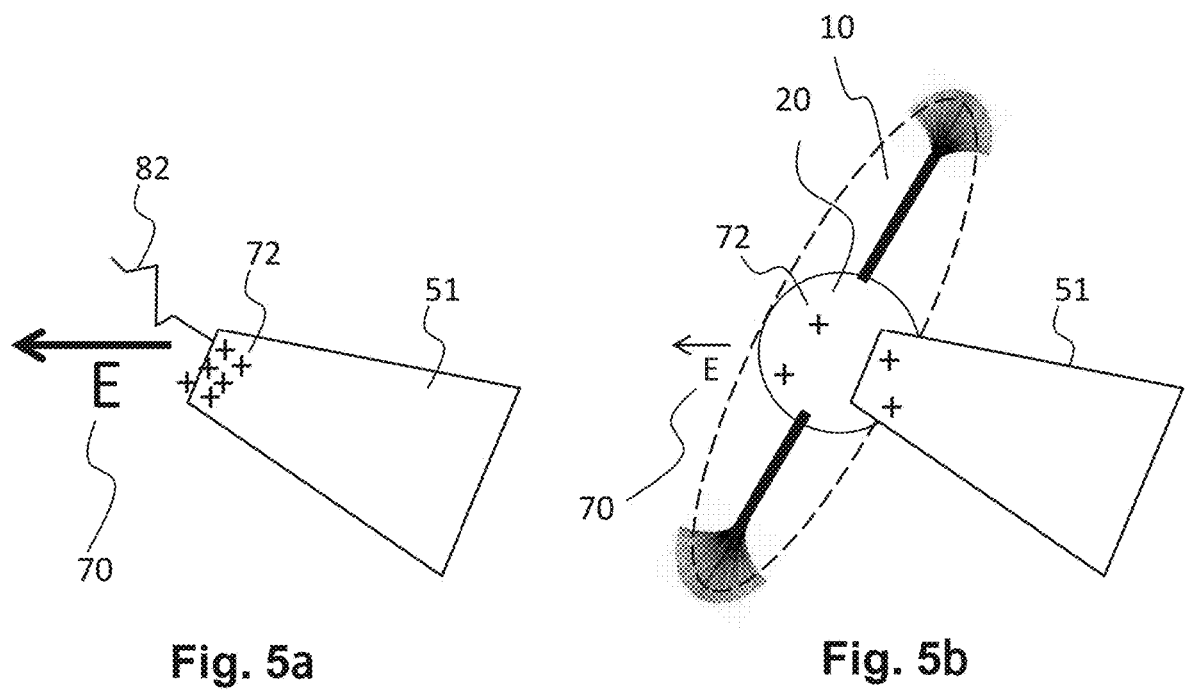
FIG. 5(a)-5(b): a schematic representation of the operation of an anti-corona element.

FIGS. 5(*a*)-5(*b*) schematically illustrate the advantage of the anti-corona element 20 forming part of the lightning protection device 10 according to the embodiment described with reference to FIG. 4.

FIG. 5(*a*) shows a concentration of positive electric charge 72 that has built up at the end of a wing 51 of an aircraft 50. This excess positive electric charge 72 at the end of a wing 51 of an aircraft 50 may in particular be observed when the aircraft 50 is subjected to an electric field induced by the presence of a negatively charged cloud 90. The electric charges 71, 72 that are present on the airframe of the aircraft 50 separate and move along the electric field. This results in an electrostatic imbalance over the airframe of the aircraft 50 and buildups of electric charges 71, 72 at the extremities. The buildups of electric charges 71, 72 may be positive (as in the example illustrated by FIG. 4) or negative, depending on the orientation of the electric field with respect to the airframe of the aircraft 50 and depending on the orientation of the extremity under consideration.

As shown in FIG. 5(*a*), an electric field 70 is then intensified at the site of the buildup of the electric charge 72 by point effect. If its amplitude exceeds a critical value corresponding to the dielectric strength of air, then corona discharges may occur. Such a corona discharge may give rise to an upward streamer 82, which, if it comes into contact with a downward leader 81 arising from a cloud 90, may result in the end of the wing 51 being struck by lightning.

It should be noted that other phenomena may play a role in the electrostatic charging of an aircraft. In particular, particles of precipitation (water droplets, ice, snow crystals, dust, etc.) exchange electric charge with the aircraft through triboelectric effect. Additionally, physical mechanisms inside the combustion chamber of the engines of an aircraft may result in positive electric charge being expelled, leaving the airframe of the aircraft negatively charged. A lightning protection device 10 also contributes to electrostatically protecting an aircraft 50, or it may even entirely replace the static dischargers conventionally used for the protection thereof.

FIG. 5(*b*) schematically shows the end of a wing 51 of an aircraft 50 to which a lightning protection device 10 has been attached. In the example under consideration, the anti-corona element 20 is a sphere made of aluminum alloy having a diameter of around 30 centimeters that completely envelops the end of the wing 51. Taking the point effect into account, the size of the electric field 70 observed on a conductive element generally increases with the increasing pointedness, angularity or sharpness of the element in question. The anti-corona element 20 forms a rounded shape at the end of the wing 51. The effect of this shape is to decrease the amplitude of the electric field 70 observed at the end of the wing 51 by, at least partly, removing the point effect. The electric potential gradient at the end of the wing 51 is then smaller since the positive electric charge 72 is distributed over the entire surface of the metal sphere. It is thus possible, for suitable dimensions of the anti-corona element 20 with respect to the dimensions of the wing 51, to keep the electric field 70 present in the vicinity of the end of the wing 51 at an amplitude value that is below the triggering threshold for a corona discharge that would be strong enough to trigger an upward streamer 82. The risk of being struck by lightning is then considerably lower.

In a known manner, high-voltage tests may be carried out in the laboratory in order to optimize the characteristics of the anti-corona element 20, in particular its shape, its dimensions, and the material used. These tests may be carried out by computer-assisted numerical modeling according to the characteristics of the airframe of the aircraft 50.

It should be noted that in the particular embodiment described with reference to FIG. 4, and in the example shown in FIG. 5(*b*), the anti-corona element 20 takes the shape of a metal sphere joined to the wing 51 of the aircraft 50 such that it envelops the end of said wing 51. For obvious reasons relating to weight, this sphere is advantageously hollow, since only its outer surface matters for the desired effects. According to other examples, the anti-corona element 20 could take another shape having rounded edges, such as for example a torus or a ring, or even be made of a composite material with a metallized surface.

In particular embodiments, the anti-corona element 20 forms an integral part of the wing 51 and thus corresponds to a particular shape of the end of the wing 51. It is then incorporated into the airframe of the aircraft 50 during the assembly phase of the airframe under consideration.

Figure 6:
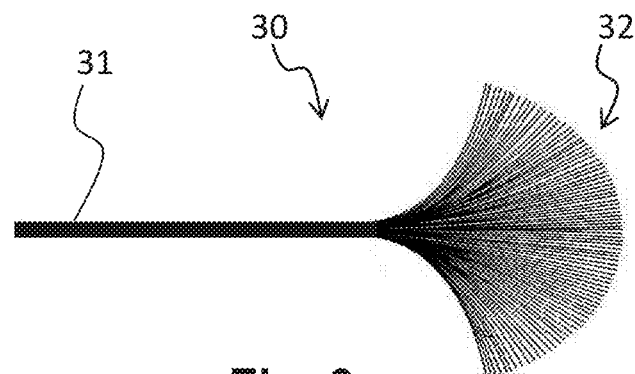
FIG. 6: a schematic representation of a charge dissipator of the lightning protection device.

FIG. 6 schematically shows one of the two charge dissipators 30 forming part of the lightning protection device 10 according to the embodiment described with reference to FIG. 4. It comprises a rod 31, one end of which serves as an attachment point for a set 32 of filaments 33. The rod 31 and the filaments 33 are electrically conductive. The attachment means used to attach the filaments 33 to the end of the rod 31 is such that it allows an electrical connection between the rod 31 and each filament 33. Preferably, the filaments 33 are not twisted.

In the example under consideration, the rod 31 is made of steel and the filaments 33 are made of carbon fiber. The electrical resistivity of a filament 33 is thus substantially (at least 100 times) higher than that of the rod 31. The rod 31 is around 20 cm long and 1 cm in diameter, the length of each filament 33 is of the order of 5 to 10 cm. The thickness of a filament 33 is around 100 µm. The assembly 32 is composed of several tens of filaments 33.

The operating principle of such a charge dissipator 30 is based on the point effect, i.e. the amplitude of the electric field in the vicinity of a conductor at a certain electric potential increases with the increasing thinness of the conductor. Furthermore, a corona discharge brought about by the ionization of the ambient air surrounding the conductor occurs only if the amplitude of the electric field in the vicinity of the conductor is higher than a critical value corresponding to the dielectric strength of air. The power dissipated by a corona discharge decreases with the increasing thinness of the conductor and with the increasing strength of its electrical resistivity. Thus, by using thin and resistive carbon fiber filaments 33, the generation of small, very low-energy corona discharges (referred to as "corona micro-discharges") is promoted. These corona micro-discharges are small enough not to trigger an upward streamer 82. By grouping together a set 32 of filaments 33, a multiplicity of corona micro-discharges is obtained, which micro-discharges are decorrelated with respect to one another and are suitable for effectively discharging a portion of the airframe of an aircraft 50 without risking the generation of an upward streamer 82, which could result in a lightning discharge.

Thus, the shape and size of the filaments 33 make it possible to strengthen the field in an extremely small volume in the vicinity of each filament 33, providing conditions that are favorable for the dissipation of charge by corona effect but unfavorable for the transformation of these corona discharges into lightning streamers.

Figure 7:
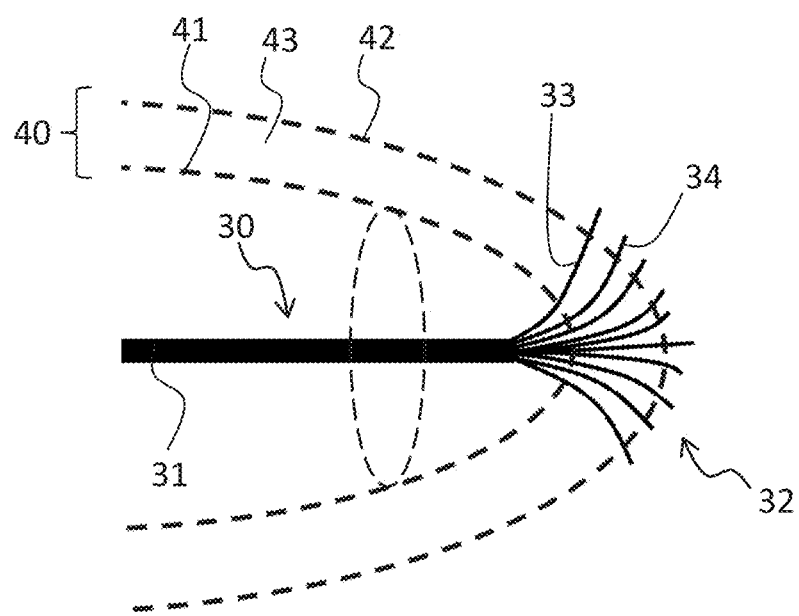
FIG. 7: a detailed schematic representation of a portion of the charge dissipator shown in FIG. 6.

FIG. 7 illustrates how the rod 31 and the filaments 33 of the charge dissipator 30 are incorporated into the dielectric shell 40, which, in the example under consideration, is a hollow shell, the wall 43 of which is made of glass fiber and is a few centimeters thick. The thickness of the wall is chosen according to the material used so as to exhibit a level of mechanical strength that is suitable for the aerodynamic forces to which it is subjected when in use. The wall 43 of the dielectric shell 40 has an inner surface 41 and an outer surface 42.

For the sake of clarity of the figure, only around 10 filaments 33 are shown. The length and arrangement of the filaments 33 are suited to the ellipsoidal shape of the dielectric shell 40, the aim of such arrangements being in particular to improve the aerodynamics of the lightning protection device 10. It can be seen, in particular in FIG. 7, that only a small part of the end 34 of each filament 33 protrudes from the dielectric shell 40, for example between 1% and 10% of the length of the filament 33 protrudes from the shell 40. It is at this end 34 that the corona micro-discharges into the air take place. The characteristics of the rod 31 and of the filaments 33, such as the material used, their thickness, their length, their arrangement, their number, etc., may for example be defined in the laboratory, in a conventional manner, through high-voltage tests. The portion of the filament 33 that protrudes from the dielectric shell 40 must be long enough to allow the dissipation of the electric charge and small enough to limit its fragility. This length should be optimized through testing. For example, an end 34 of each filament 33 protrudes from the dielectric shell 40 by a length that is at least equal to 10% of the thickness of the shell 40 through which said filament 33 passes.

Besides enhancing the aerodynamics of the lightning protection device 10, the dielectric shell 40 presents an additional advantage afforded by a distortion and a strengthening of the local electric field existing at the ends 34 of the filaments 33 of the charge dissipator 30 caused by the permittivity of the dielectric. Thus, without affecting the overall risk of generating a corona discharge that is strong enough to initiate an upward streamer 82, this phenomenon locally promotes the generation of corona micro-discharges at the ends 34 of the filaments 33 of the charge dissipator 30, thereby making it possible to improve the dissipation of the electric charges 71, 72 that have built up on the portion of the airframe of the aircraft 52 to which the lightning protection device 10 is attached.

Figure 8:
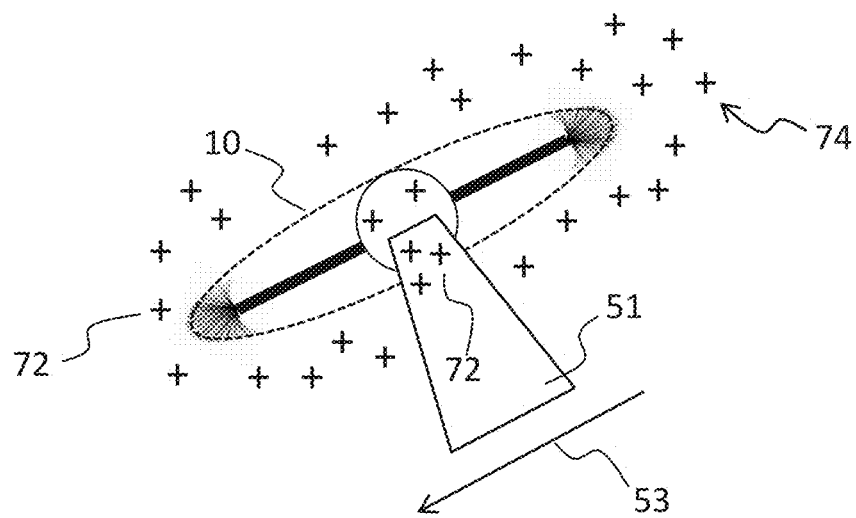
FIG. 8: a schematic representation of the installation of a lightning protection device according to the invention at one end of the airframe of an aircraft.

FIG. 8 schematically shows a lightning protection device 10 according to the embodiment described with reference to FIG. 4 and attached to the end of a protruding portion of the airframe of the aircraft 50. In the example illustrated in FIG. 8, the lightning protection device 10 is attached to the end of a wing 51 such that the anti-corona element 20 envelops an end rib of the wing 51. Thus, the angular portions at the end of the wing 51, which are liable to give rise to point effects in the electric field, are removed. In the example under consideration, a buildup of positive electric charge 72 is formed at the end of the wing 51, for example under the effect of an electric field induced by the presence of a cloud 90.

Advantageously, the axis formed by the rods 31 of the two charge dissipators 30 (which in the example under consideration coincides with the longest axis of the ellipsoid formed by the dielectric shell 40) is oriented along the main direction 53 of the aircraft 50. Such arrangements provide at least two advantages. A first advantage is that it limits the effect of the lightning protection device 10 on the drag of the aircraft 50. Specifically, the vertices of the ellipsoid formed by the dielectric shell 40 are positioned such that the flow of air over the lightning protection device 10 is optimal as the aircraft 50 is moving. A second advantage comes from the fact that all of the electric charge 72 dissipated by the two charge dissipators 30 will form a space charge region 74 that will envelop the end of the wing 51 and will thus limit the electric field 70 observed at the end of the wing 51. Specifically, the positioning of the charge dissipators 30 along the main direction 53 of movement of the aircraft 50 is such that the electric charge 72 dissipated into the air by the dissipator 30 located toward the front of the aircraft 50 will substantially follow the surface of the dielectric shell 40 along its longest axis before being removed. This flow of electric charge 72 through the air in proximity to and along the surface of the dielectric shell 40 caused by the movement of the aircraft 50 thus allows the end of the wing 51 to be enveloped in a space charge region 74.

In particular embodiments, the dielectric shell 40 has an opening such that a portion of the anti-corona element 20 is flush with the outer surface 42 of the shell 40. In this way, if a lightning strike occurs despite all of the means implemented by the lightning protection device 10, the point of impact of the lightning will preferably be at this flush portion of the anti-corona element 20, thus limiting the risk of the shell 40 being perforated and the lightning protection device 10 being damaged. The flush area of the anti-corona element 20 may be painted in order to prevent corrosion phenomena and/or for esthetic appearance.

Figure 9:
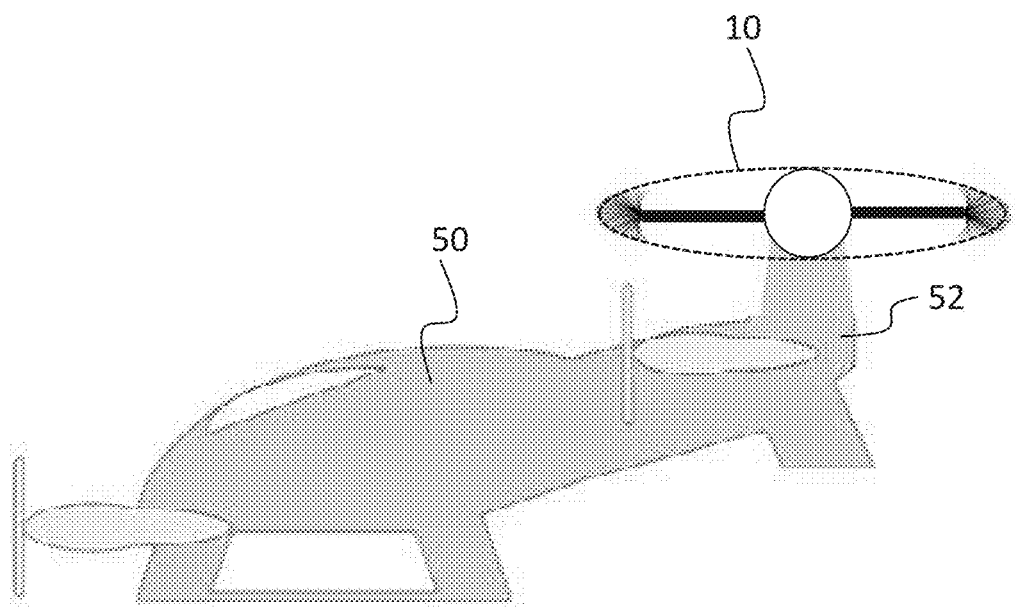
FIG. 9: a schematic representation of the installation of a lightning protection device according to the invention on a small aircraft.

FIG. 9 illustrates an example of the installation of a lightning protection device 10 according to the invention on a small aircraft 50 acting as a personal air vehicle. In the example shown in FIG. 9, the lightning protection device 10 is in accordance with the particular embodiment described with reference to FIG. 4, and it is attached to the upper end of the vertical portion of the empennage 52 of the aircraft 50.

It should be noted that this is a completely nonlimiting embodiment, and that in other variants, the lightning protection device 10 could also be placed at the lower end of the vertical portion of the empennage 52, or else, depending on the shape of the airframe of the aircraft 50, at the tips of the wings 51 or at the end of other protruding portions at which corona discharges have a tendency to occur naturally. Advantageously, a plurality of lightning protection devices 10 may be arranged at various sites on the airframe of the aircraft 50 corresponding to areas that are liable to receive a lightning strike.

The means for attaching a lightning protection device 10 to the airframe of the aircraft 50 are not described in detail since they fall outside the scope of the invention. They may be implemented by conventional methods for assembling the parts of an aircraft (welding, bonding, riveting, screwing, etc.). Electrical continuity should however be provided between the anti-corona element 20 and the area of the airframe of the aircraft 50 protected by the lightning protection device 10, such that electric charges 71, 72 that have built up in said area may be distributed over the surface of the anti-corona element 20.

The above description clearly illustrates that, through its various features and the advantages thereof, the present invention achieves the set objectives. In particular, the lightning protection device 10 considerably decreases the risk of an aircraft 50 being struck by lightning while limiting the effect thereof on its aerodynamic drag. The weight and the cost of manufacturing such a device also remain particularly advantageous.

Aspects of the invention advantageously combine two elements having opposite intrinsic functions, but the combination of which meets the desired objectives. Specifically, aspects of the invention involve both an anti-corona element 20, the function of which is to prevent the formation of a corona discharge that could give rise to an upward streamer 82 capable of initiating a lightning discharge, and at least one charge dissipator 30, the function of which is to generate corona discharges of small size in order to dissipate a buildup of electric charge.

The various elements of the lightning protection device 10 work in synergy to decrease the point effect of an extremity of the airframe of an aircraft 50:

the anti-corona element 20 decreases the potential gradient at the extremity to be protected;
  the charge dissipators 30 decrease the electric potential of the extremity to be protected;
  the position of the charge dissipators 30 allows the extremity to be protected to be enveloped in a space charge region 74, such that it no longer has the appearance of an electric point;
  the dielectric shell 40, if present, improves the efficiency of the charge dissipators 30.

It is indeed the combination of several of these effects that provides the lightning protection device 10 according to an embodiment of the invention with its significant effectiveness.

In general, it should be noted that the embodiments considered above have been described by way of nonlimiting examples, and that other variants can therefore be envisaged.

In particular, the number of charge dissipators 30 included in the lightning protection device 10 is not limited to two. Specifically, a lightning protection device 10 according to an embodiment of the invention may include only one charge dissipator 30 or more than two charge dissipators 30. Additionally, the characteristics of such a charge dissipator 30 may vary. In the example under consideration, the rod 31 is made of steel and the filaments 33 are made of carbon fiber. Other electrically conductive materials may however be envisaged for producing a charge dissipator 30. Preferably, the rod 31 is made of metal, and the filaments 33 are made of a conductive material exhibiting higher electrical resistivity (for example at least hundred times higher than that of the rod 31) and their diameter is particularly small (for example between 100 μm and 500 μm) in order to limit the intensity of the corona micro-discharges.

In the example under consideration, the anti-corona element 20 is a hollow metal sphere made of an aluminum alloy. However, there is nothing to rule out envisaging other rounded shapes for the anti-corona element 20, such as for example an ovoid, a torus, a ring, etc. Additionally, another material may be chosen if it exhibits good surface electrical conductivity and is relatively lightweight.

In the example under consideration, the dielectric shell 40 is ellipsoidal in shape and is made of glass fiber for its resistance to mechanical stresses and its electrical insulation properties. However, there is nothing to rule out envisaging other shapes and other materials for producing the dielectric shell 40, or even not using a dielectric shell 40, for example if aerodynamics and protection from the environment are of little or no importance for the object protected by the lightning protection device 10.

The dimensions of the various elements of the lightning protection device 10 are chosen according to the dimensions of the portions of the airframe of the aircraft 50 that should be protected from a lightning strike. Additionally, the dimensions indicated in the described embodiments have been provided by way of completely nonlimiting example.

Aspects of the invention has been described by way of completely nonlimiting example by considering the case of a small aircraft 50 developed for the role of personal air vehicle. Specifically, such an aircraft 50 is intended for low altitude flight in all weathers for everyday journeys, and its particularly light, energy-saving structure generally affords it only limited protection from the damage caused by lightning (since its airframe does not contain metal shielding for carrying away a lightning current and limiting the damage caused by a lightning strike). However, according to other examples, there is nothing to rule out considering other types of vehicles, whether they be air, sea or land vehicles, or even using a lightning protection device 10 to protect fixed objects such as for example certain parts of a building.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lightning protection device for an aircraft, comprising:
   an anti-corona element having a rounded shape and having an electrically conductive surface, configured for enveloping an area of an airframe of the aircraft that is liable to receive a lightning strike;
   at least one electric charge dissipator attached to said anti-corona element;
   a second electric charge dissipator; and
   a dielectric shell surrounding the anti-corona element and the at least one and the second electric charge dissipators, each of the at least one and the second electric charge dissipators passing at least partially through said dielectric shell,
   wherein each of the at least one and the second electric charge dissipators comprises an electrically conductive rod, a first end of the electrically conductive rod attached to the anti-corona element and a second end of the electrically conductive rod serving as an attachment point for a set of electrically conductive filaments, of which only one end of each of the set of electrically conductive filaments, distal from the rod, protrudes from the dielectric shell,
   wherein the anti-corona element is substantially spherical, the dielectric shell is substantially ellipsoidal in shape, the center of the dielectric shell substantially coinciding with the center of the anti-corona element, and
   wherein each of the at least one and the second electric charge dissipators extends radially from the anti-corona element at two points that are diametrically opposed along the longest axis of the ellipsoid formed by the dielectric shell.

2. The lightning protection device as claimed in claim 1, wherein a portion of the electrically conductive surface of the anti-corona element is flush with an outer surface of the dielectric shell so as to form a preferential area for receiving the lightning strike.

3. The lightning protection device as claimed in claim 1, wherein the set of the electrically conductive filaments of each of the at least one and the second electric charge dissipators conforms to the shape of a vertex of an ellipsoid formed by the dielectric shell.

4. The lightning protection device as claimed in claim 1, wherein, for each of the at least one and the second electric charge dissipators, the end of the electrically conductive filament that is distal from the electrically conductive rod protrudes from the dielectric shell by a length that is at least equal to 10% of a thickness of said dielectric shell through which said electrically conductive filament passes.

5. The lightning protection device as claimed in claim 1, wherein the anti-corona element is formed in an aluminum alloy.

6. An aircraft, comprising a lightning protection device as claimed in claim 1.

7. An aircraft, wherein an airframe of the aircraft incorporates a lightning protection device as claimed in claim 1, such that the major axis of an ellipsoid formed by the dielectric shell substantially coincides with a main direction of movement of the aircraft.

8. A lightning protection device for an aircraft, comprising:
   an anti-corona element having a rounded shape and having an electrically conductive surface, configured for enveloping an area of the airframe of the aircraft that is liable to receive a lightning strike;
   at least one electric charge dissipator attached to said anti-corona element; and
   a set of electrically conductive filaments,
   wherein the at least one electric charge dissipator comprises an electrically conductive rod, a first end of the electrically conductive rod attached to the anti-corona element and a second end of the electrically conductive rod serving as an attachment point for the set of electrically conductive filaments, and wherein each electrically conductive filament has a diameter comprised between 50 and 500 µm and is made of a conductive material having an electrical resistivity at least 100 times higher than that of the electrically conductive rod.

* * * * *